United States Patent Office 3,832,331
Patented Aug. 27, 1974

3,832,331
POLYSULPHONES PREPARED FROM 3-(4-CHLORO-PHENYLSULPHONYL)PHENOL AND METHOD OF PREPARATION
Alan Branford Newton, Welwyn Garden City, England, assignor to Imperial Chemical Industries Limited, London, England
No Drawing. Continuation of abandoned application Ser. No. 803,961, Mar. 3, 1969. This application May 17, 1972, Ser. No. 254,036
Int. Cl. C08g 23/00
U.S. Cl. 260—49    8 Claims

ABSTRACT OF THE DISCLOSURE

New polymers and copolymers containing units of formula

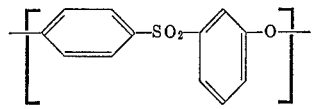

may be made by nucleophilic poly-condensation of alkali metal salts of ahlo-phenols of formula

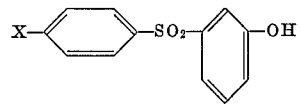

(where X is halogen) which are also new chemical compounds.

---

This is a continuation of application Ser. No. 803,961, filed Mar. 3, 1969, now abandoned.

This invention relates to new polymers and to new chemical compounds useful for making the new polymers.

The polymers of the invention contain units of formula I

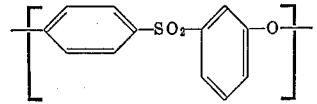

alone or with other units. A polymer consisting essentially of repeating units of formula I is a substantially linear amorphous thermoplastic material which has a very high stability to thermal and chemical degradation and is relatively easy to fabricate into shaped articles.

If other units are present in the polymers, they are conveniently units of formula II

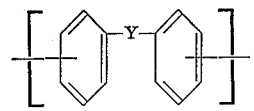

where Y is —SO$_2$—, —SO— or —CO— or a radical of the formula —Y'—A—Y'' in which Y' and Y'' are the same or different and each is —SO$_2$—, —SO— or —CO— and A is a bivalent organic radical which may be aliphatic, aromatic or heterocyclic and has both valencies linked to carbon atoms, and they are conveniently units of formula III

 (III)

where E is the residuum of a dihydric phenol and E' is the residuum of a benzenoid compound having an inert electron-withdrawing group in at least one of the positions ortho or para to the valence bonds. Such units are more fully defined and described in British specification 1,078,234, the entire disclosure of which is herewith incorporated by reference. However, it is convenient to note herein that E and E' are described in British specification 1,078,234 as follows:

"The residuum E of the dihydric phenol of these alkali metal salts is not narrowly critical. It can be, for instance, a mono-nuclear phenylene group as results from hydroquinone and resorcinol, or it may be a di- or polynuclear residuum. Likewise it is possible that the residuum be substituted with other inert nuclear substituents, e.g. halogen, alkyl, and alkoxy substituents. . . .

"Hence, it is preferred that the dihydric phenol be a weakly acidic dinuclear phenol, for example, the dihydroxy diphenyl alkanes or the nuclear halogenated derivatives thereof, for example, the 2,2-bis(4-hydroxyphenyl)-propane, 1,1-bis(4-hydroxyphenyl)2-phenyl ethane, bis-(4-hydroxyphenyl)methane, or the chlorinated derivatives containing one or two chlorines on each aromatic ring. . . . Other materials also termed appropriately 'bisphenols' are also highly valuable and preferred. These materials are the bisphenols of a symmetrical or unsymmetrical joining group, as, for example, ether oxygen (—O—),
carbonyl

sulfide (—S—),
sulfone

or hydrocarbon residue in which two phenolic nuclei are joined to the same or different carbon atoms of the residue, for example, the bisphenol of acetophenone, the bisphenol of benzophenone, the bisphenol of vinyl cyclohexene, the bisphenol of α-pinene, and bisphenols where the hydroxyphenyl groups are bound to the same or different carbon atoms of an organic linking group.

"Such dinuclear phenols can be characterized as having the structure:

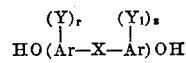

wherein Ar is an aromatic group and preferably is a phenylene group, Y and Y$_1$ can be the same or different inert substituent groups (e.g. alkyl groups having from 1 to 4 carbon atoms, halogen atoms, i.e. fluorine, chlorine, bromine or iodine, or alkoxy radicals having from 1 to 4 carbon atoms), r and z are 0 or integers having a value from 1 to 4, inclusive, and X is representative of a bond between aromatic carbon atoms as in dihydroxydiphenyl, or is a divalent radical, including for example, inorganic radicals

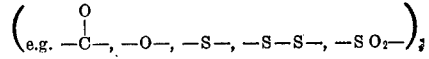

and divalent organic hydrocarbon radicals e.g. alkylene, alkylidene, cycloaliphatic, or the halogen, alkyl, aryl substituted alkylene, alkylidene and cycloaliphatic radicals as well as an alkalicyclic, alkarylene and aromatic radicals and a ring fused to both Ar group.

"Examples of specific dihydric polynuclear phenols include among others: the bis(hydroxyphenyl)alkanes, e.g. 2,2 - bis - (4-hydroxyphenyl)propane, 2,4'-dihydroxy-diphenylmethane, bis-(2 - hydroxyphenyl)methane, bis-(4-hydroxyphenyl)methane, bis - (4-hydroxy-2,6-dimethyl-3-methoxyphenyl)methane, 1,1-bis-(4-hydroxyphenyl)-ethane, 1,2-bis-(4-hydroxyphenyl)ethane, 1,1-bis-(4-hydroxy-2-chlorphenyl)ethane, 1,1 - bis-(3-methyl-4-hydroxyphenyl)propane, 1,3-bis-(3-methyl-4-hydroxyphenyl)propane, 2,2 - bis-(3-phenyl-4-hydroxyphenyl)-propane, 2,2-bis-(3-isopropyl-4-hydroxyphenyl)propane, 2,2-bis-(2-isopropyl- 4-hydroxyphenyl)-propane, 2,2-bis-(4-hydroxynaphthyl) propane, 2,2-bis-(4 - hydroxyphenyl)pentane, 3,3-bis-(4-hydroxyphenyl)pentane, 2,2-bis-(4 - hydroxyphenyl)heptane, bis-(4-hydroxyphenyl)phenylmethane, 2,2-bis-(4-hydroxyphenyl) - 1 - phenylpropane and 2,2-bis-(4-hydroxyphenyl)-1,1,1,3,3,3 - hexafluoropropane: di(hydroxyphenyl)sulfones, e.g. bis-(4-hydroxyphenyl)-sulfone, 2,4'-dihydroxy-diphenyl sulfone, 5'-chloro - 2,4' - dihydroxydiphenyl sulfone, and 5'-chloro-4,4'-dihydroxydiphenyl sulfone: di(hydroxyphenyl)ethers, e.g. bis-(4-hydroxyphenyl)ether, the 4,3'-, 4,2'-, 2,2'-, 2,3'-, dihydroxydiphenyl ethers, 4,4'-dihydroxy-2,6-dimethyldiphenyl ether bis-(4-hydroxy-3-isobutylphenyl)ether, bis-(4-hydroxy-3-isopropylphenyl)-ether, bis-(4-hydroxy-3-chlorophenyl) ether, bis - (4-hydroxy-3-fluorophenyl)-ether, bis-(4-hydroxy-3-bromophenyl)ether, bis-(4 - hydroxynaphthyl)ether, bis-(4-hydroxy-3-chloronaphthyl)ether, bis-(2-hydroxyphenyl)ether, 4,4'-dihydroxy-3,6-dimethoxydiphenyl ether, and 4,4'-dihydroxy-2,5-diethoxydiphenyl ether.

\* \* \* \* \* \*

"Any dihalobenzenoid compound or mixture of dihalobenzenoid compounds can be employed in this invention which compound or compounds has the two halogens bonded to benzene rings having an electron withdrawing group in at least one of the positions ortho or para to the halogen groups. The dihalobenzenoid compound can be either mononuclear where the halogens are attached to the same benzenoid ring or polynuclear where they are attached to different benzenoid rings, as long as there is the activating electron withdrawing group in the ortho or para position of that benzenoid nucleus.

"Any of the halogens may be the reactive halogen substituents on the benzenoid compounds. Fluorine and chlorine substituted benzenoid reactants are preferred.

\* \* \* \* \* \*

"Any electron withdrawing group can be employed as the activator group in these compounds. It should be, of course, inert to the reaction, but otherwise its structure is not critical. Preferred are the strong activating groups e.g. the sulfone group

bonding two halogen substituted benzenoid nuclei, as in the 4,4' - dichlorodiphenyl sulfone and 4,4' - difluorodiphenyl sulfone, although such other strong withdrawing groups hereinafter mentioned can also be used with equal ease.

"The more powerful of the electron withdrawing groups give the fastest reactions and hence are preferred. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing) or other groups having a positive sigma* value, as set forth in J. F. Bunnett in Chem. Rev. 49 273 (1951) and Quart. Rev. 12 1 (1958).

"The electron withdrawing group of the dihalobenzenoid compound can function either through the resonance of the aromatic ring, as indicated by those groups having a high sigma* value, i.e. above about +0.7 or by induction as in perfluoro compounds and like electron sinks.

"Preferably the activating group should have a high sigma* value, preferably above 1.0, although sufficient activity to promote the reaction is evidenced in those groups having a sigma* value above 0.7, although the reaction rate with such a low powered electron withdrawing group may be somewhat low.

"The activating group can be basically either of two types:
(A) monovalent groups that activate one or more halogens on the same ring, e.g. a nitro group, phenylsulfone, or alkylsulfone, cyano, trifluoromethyl, nitroso, and hetero nitrogen as in pyridine.
(B) divalent group which can activate displacement of halogens on two different rings, e.g.

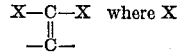

$$-\overset{H}{\underset{H}{C}}=C-; \text{ the sulfoxide group } -\overset{O}{\underset{}{S}}-; \text{ the azo-group } -N=N-; \text{ the}$$

saturated fluorocarbon groups —CF$_2$CF$_2$—; organic phosphine oxides $$-\overset{O}{\underset{R}{P}}-; \text{ where R is a hydrocarbon group, and the ethylidene group}$$

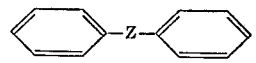

can be hydrogen or halogen or which can activate halogens on the same ring, such as with difluorobenzoquinone, 1,4- or 1,5- or 1,8-difluoroanthraquinone.

"If desired, the polymers may be made with mixtures of two or more dihalobenzenoid compounds each of which has this structure, and which may have different electron withdrawing groups. Thus the E' residuum of the benzenoid compounds in the polymer structure may be the same or different.

"It will be seen that as used herein, the term 'residuum of the (or a) benzenoid compound' means the aromatic or benzenoid residue of the dihalobenzenoid compound after the removal of the halogen atoms or the benzenoid nucleus. Thus, the residuum has an inert electron withdrawing group in at least one of the positions ortho or para to the valence bonds by which the residuum is bonded to the adjacent ether oxygen atoms; the residuum is valently bonded to the ether oxygen atoms through aromatic carbon atoms."

The substituent A is defined in British Specification 1153035, identified further hereinafter, as follows:

". . . and A is a bivalent organic radical, which may be aliphatic, aromatic or heterocyclic and has both valences linked to carbon atoms. For example A may be a bivalent aromatic radical derived from benzene, a fused-ring aromatic hydrocarbon containing not more than two aromatic rings (for example naphthalene, indene, fluorene or dibenzofuran), or a compound of the formula in which Z is a direct link, —O—, —S—, —SO$_2$—, —CO—, a bivalent hydrocarbon or substituted hydrocarbon radical (e.g. alkylene, alkylidene or a bivalent cycloaliphatic or aromatic radical), or a residue of an organic diol (i.e., the bivalent radical obtained by removing the hydrogen atoms from the two hydroxy groups)."

The polymers of the invention are a selection from the thermoplastic polysulphones having units of the formula {Ar—SO$_2$} as defined and described in British specifications 1,016,245, 1,106,366 and 1,106,367 and may be used in any of the forms and for any of the purposes proposed in those specifications, such as mouldings, fibres, films (including oriented films), surface coatings and adhesives. They may be blended with other thermoplastic materials and with pigments and fillers, for example fibrous reinforcements, solid lubricants and abrasives.

The reduced viscosity of the polymer is desirably at least 0.3 (measured at 25° C. on a solution in dimethyl formamide containing 1 g. of polymer in 100 cm.$^3$) if it is to serve for structural purposes, and it is desirably about 0.4 or more, although polymers of very high molecular weight tend to be insoluble and more difficult to fabricate.

A homopolymer consisting essentially of repeating units of formula I has a thermal stability in air which is practically identical with that of the polysulphone having repeating units of formula IV and is better than that of the polysulphone having repeating units of formula V

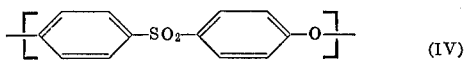

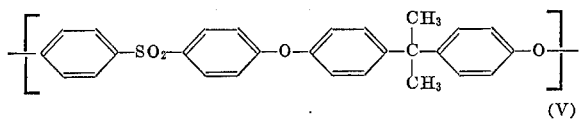

However, its glass-transition point (measured by differential thermal calorimetry) is about 175° C., compared with 195° C. for the polysulphone of units of formula V and 226° C. for the polysulphone of units of formula IV. Thus it possesses the excellent oxidative stability of the polysulphones of units of formula IV coupled with an ease of fabrication superior even to that of the polysulphone of units of formula V.

The copolymers of the invention afford a means of increasing the ease of fabrication of polysulphones without diminishing their thermal and chemical stability. Random and more especially block copolymers of units of formulae I and IV are of particular interest.

The polymers of the invention may be made by an electrophilic polycondensation of 3-phenoxybenzenesulphonyl chloride, alone or copolymerised with other aromatic sulphonyl chlorides, as described in British specifications, 1,016,245, 1,060,546 and 1,109,842.

The polymers of the invention are, however, more readily made from alkali metal salts of the novel halo-phenols of formula VI

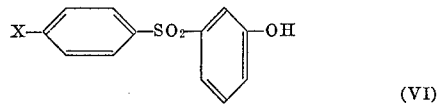

(where X is halogen) which polymerise by the displacement of alkali metal halide. Polymerisations of these novel salts occurs much more readily than the polymerisation of the corresponding alkali metal 4-(4-halophenylsulphonyl)phenoxides (to give polymers of units of formula IV).

The halogen atom X is preferably chlorine or fluorine. The fluorine derivatives generally are more reactive and enable the displacement of alkali metal halide to be carried out even more quickly, but are more expensive. Bromine derivatives are also relatively expensive and although they resemble the chlorine derivatives in performance they would seem to offer no advantages. Iodine derivatives are generally less suitable.

The alkali metal cation is conveniently potassium or sodium. Displacement of alkali metal halide often occurs more readily if the potassium cation is present in the reagent used, but the weight (and usually the price) per mole of a potassium compound is higher than for the corresponding sodium compound. Some or all of the alkali metal cation in the reagent may be replaced by an organic onium cation having a positively charged hetero-atom (for example a quaternary ammonium cation such as tetramethylammonium) stable under the conditions of the reaction, and the term "alkali metal salt" as used herein is deemed to refer also to salts containing such onium cations.

The polymerisation may be carried out in the melt or in the presence of a polar liquid diluent which itself is unreactive under the conditions employed and is a solvent for the resultant polymer and preferably also for the polymerisable starting material. The reaction may be carried out in an extruder. The reaction vessel should in any case be made of or lined with a material which is inert to alkali and to alkali metal halides under the conditions employed.

Suitable polar liquids for the reaction include: the lower dialkyl and cyclic alkylene sulphoxides and sulphones (e.g. dimethyl sulphoxide and 1,1-dioxothiolan), nitriles (e.g. benzonitrile), diaryl ketones (e.g. benbophenone), diaryl sulphoxides and sulphones, ethers (e.g. dioxane, diethylene glycol dimethyl ether, diphenyl ether, methoxyphenyl ethers) and non-olefinic tertiary alcohols (e.g. t-butanol). Mixtures of such substances may conveniently be used, e.g. when one or more components of the mixture would otherwise be solid at the reaction temperature. The amount of the liquid used is desirably sufficient to ensure that none of the starting materials are in the solid state in the reaction mixture but not so large as to be economically disadvantageous.

A practical advantage provided by the present invention, compared with the polymerisation of an alkali metal salt of a 4-(4-halophenylsulphonyl)phenol as described in Dutch specification 66,13475 (British complete specification 40,734/65), is that the alkali metal salts of the corresponding 3-(4-halophenylsulphonyl) phenols polymerise readily at lower temperatures. For example, the sodium or potassium salt of 4-(4-chlorophenylsulphonyl)phenol cannot be polymerised in the presence of dimethyl sulphoxide, which is otherwise a most convenient solvent, because the temperature required is above the decomposition point of dimethyl sulphoxide, but dimethyl sulphoxide can be used in polymerising the sodium or potassium salt of 3-(4-chlorophenylsulphonyl)phenol according to the present invention.

A reagent to neutralise any oxygen-containing anions may be introduced at the end of the polymerisation. Reactive monofunctional halides, for example methyl chloride, are particularly suitable.

The alkali metal haldie formed in the polymerisation can be removed from the resultant high polymer by any suitable means. For example, it can be extracted from the high polymer using water, or the polymer itself can be dissolved in a strongly polar organic solvent (for example dimethyl formamide, 1-methyl-2-oxo-pyrrolidine, dimethyl sulphoxide, 1,1-dioxothiolan or nitrobenzene) and then reprecipitated by addition to a liquid such as water which is miscible with the polymer solvent but itself a non-solvent for the polymer.

When the polymer is formed in solution, a convenient procedure is to add the reaction mixture (which may be decanted or filtered from solid alkali metal halide) to an excess of a liquid which is miscible with the reaction solvent but in which the polymer is insoluble. If the reaction solvent is water-miscible, or is miscible with a liquid in which residual alkali metal halide also dissolves, the polymer can thus be obtained in one step. Otherwise, as for example if the reaction mixture is poured into methanol, the precipitated polymer initially contains alkali metal halide which can subsequently be washed out with water.

Copolymers according to the invention are conveniently made by including an alkali metal salt of a halo-phenol of formula VI as an additional component in an anhydrous polymerisable reaction mixture containing a double alkali metal salt of a dihydric phenol with a dihalobenzenoid compound having an inert electron-withdrawing group in at least one of the positions ortho or para to the halogen atoms in the liquid phase of an inert highly polar organic solvent, as described in British specification 1,078,234. Copolymers may also be made by copolymerising an alkali metal salt of a halo-phenol of formula VI with an alkali metal salt of a 4-(4-halophenylsulphonyl)phenol or a 4-(4-halobenzoyl)phenol under conditions for polymerising the latter substances as described in Dutch application 66,13475. Owing to the very ready polymerisation of the monomers of this invention, block copolymers may be formed unless precautions are taken to obtain random copolymers, e.g. by feeding the monomer of this invention into the reaction mixture as the reaction takes place, or by choosing a more reactive halogen in the comonomer. For example the sodium or potassium salt of 3-(4-chlorophenylsulphonyl)phenol may be copolymerised with the potassium or sodium salt of 4-(4-fluorophenylsulphonyl)phenol. In making the copolymers by a method as described in Dutch application 66,13475, the alkali metal salt of the 3-(4-halophenylsulphonyl)phenol may be included if desired in the initial charge of dihalobenzenoid compound and alkali metal hydroxide.

The halo-phenols of formula VI and their alkali metal salts are new compounds which can be made by methods known *per se*, for example by the Friedel-Crafts condensation of a 4-halophenylsulphonyl chloride with benzene and nitration of the product to give an intermediate halo-nitrile compound of formula VII

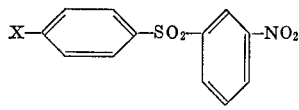

(VII)

which can then be reduced to the halo-aniline which can then be diazotised and heated in an aqueous medium to give the halophenol of formula VI.

The alkali metal salts are obtained by treating the halophenols of the invention with a suitably basic alkali metal compound, for example an alkali metal hydroxide or alkoxide.

The new phenols of the invention are also valuable chemical intermediates in fields other than polymer chemistry. For example, the halogen atom can be replaced by amino and substituted amino groups giving a wide variety of substances.

The following examples illustrate the invention.

EXAMPLE 1

3 - (4 - Chorophenylsulphonyl)nitrobenzene (15 g.) was dissolved in acetic acid (200 cm.³) and powdered zinc (50 g.) was added. Concentrated hydrochloric acid was added with heating until the zinc dissolved completely. An excess of sodium hydroxide was then added and the slurry was extracted twice with diethyl ether (2×300 cm.³). The ether was evaporated off leaving 3-(4-chlorophenylsulphonyl) aniline (9.8 g.) which was recrystallised from ethanol: yield 9 g., m.p. 145° C. The carbon, hydrogen, nitrogen and chlorine analysis and the infra-red and nuclear-magnetic-resonance spectra were consistent with the structure

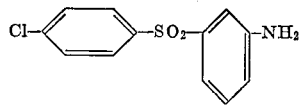

This amine (5.6 g.; 0.02 mole) was dissolved in glacial acetic acid (15 cm.³) and aqueous sulphuric acid (0.06 equivalents $H_2SO_4$ in 30 cm.³ of $H_2O$) was added. Sodium nitrite (1.54 g.; 0.022 mole) dissolved in a little water was added while the mixture was kept at 5–10° C. The mixture was allowed to stand for 10 minutes at 50° C. The diazotised solution was then poured into boiling dilute sulphuric acid and 3 - (4 - chlorophenylsulphonyl) phenol was formed as a solid and was filtered off from the cooled mixture. It was washed, dissolved in alkali, reprecipitated with acid, washed and dried; yield 6 g., m.p. 165–168° C. Sublimation under high vacuum at 200° C. and recrystallisation from toluene gave pure white needles, m.p. 170° C. The elemental analysis and the infra-red and nuclear-magnetic-resonance spectra were consistent with the structure

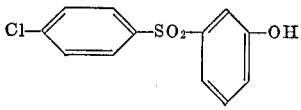

The potassium salt was prepared from this phenol in the absence of air by using an exact equivalent of potassium hydroxide in aqueous methanol. On evaporating the solvent it was obtained as a yellow powder, m.p. 285° C., with polymerisation.

EXAMPLE 2

The pure potassium salt (1.60 g.) of 3-(4-chlorophenylsulphonyl)phenol prepared as described in Example 1 was heated at 300° C. under reduced pressure for 15 minutes. The resultant polymer was crushed and thoroughly washed with hot water to remove potassium chloride. The polymer was partially soluble in dimethyl formamide. The soluble fraction (0.3 g.) was of very high molecular weight with a reduced viscosity of 2.3. The insoluble fraction (0.5 g.) was swollen by hot dimethyl formamide, by 1,1-dioxothiolan at 230° C., and by hot 2-chlorophenol, and it is believed to be a linear polymer of extremely high molecular weight. On compression-moulding at 320° C. both fractions gave tough clear films. Both were amorphous and both showed a $T_g$ of 175° C. by differential scanning calorimetry. Both fractions had an elemental analysis corresponding to the empirical formula $C_{12}H_8O_3S$ and the soluble fraction had infrared and nuclear - magnetic - resonance spectra consistent with the structure

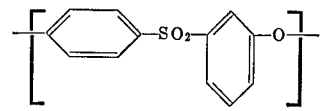

The thermogravimetric analysis in air of the soluble fraction was practically identical with that of a polymer of units of formula IV.

EXAMPLE 3

The potassium salt (0.34 g.) of 3-(4-chlorophenylsulphonyl)phenol dissolved in dimethyl sulphoxide (0.78 g.) was heated at 150° C. for 16 hours under a slow stream of nitrogen. The reaction mixture was poured into water and the precipitated polymer was filtered off. Titrations of residual base and of chloride ion in the aqueous washings indicated that the polymerisation reaction was about 99% complete. The polymer had a reduced viscosity of 0.25 and was completely soluble in chloroform as well as in dimethyl formamide. The $T_g$ by differential scanning calorimetry was 164° C. The infre-red spectrum was identical with that of the soluble fraction of reduced viscosity 2.3 described in Example 2.

EXAMPLE 4

The potassium salt (10 g. of 3-(4-chlorophenylsulphonyl)phenol and the potassium salt (26 g.) of 4-(4-fluorophenylsulphonyl)phenol were stirred together in dimethyl sulphone (30 g.) under a slow stream of nitrogen in a glass flask which was gradually heated up to 200° C. and maintained at that temperature for 18 hours. The reaction mixture was then cooled to 150° C., diluted with 20 cm.³ of anhydrous dimethyl sulphoxide and treated with methyl chloride. After 30 minutes, the mixture was poured into water to precipitate the polymer, which was washed with hot water and then with methanol and dried in a vacuum oven. The polymer was completely soluble in dimethyl formamide, and it was reprecipitated by pouring its solution in this solvent into aqueous methanol and was again washed and dried. The polymer thus obtained (23.2 g.) had a reduced viscosity of 0.64, measured as usual on a solution in dimethyl formamide at 25° C. containing 1 g. of polymer in 100 cm.³ of solution. The $T_g$ by differential scanning calorimetry was 203° C. The polymer was amorphous. A transparent yellow compression moulding 3 mm. thick made at 320° C. was so tough that a nail of 3 mm. diameter could be driven into it without cracking it. This copolymer thus had a $T_g$ approaching that of the homopolymer of units of formula IV but it differed from this

I claim:
1. A polymer consisting essentially of
(1) units of formula I:

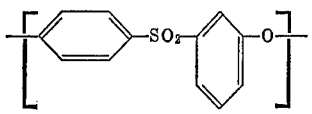

(2) units of formula I and formula II

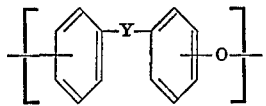

where Y is —SO₂—, —SO— or —CO— of a radical of the formula —Y'—A—Y'''' in which Y' and Y'' are the same or different and each is —SO₂—, —SO— or —CO— and A is a bivalent organic radical which may be aliphatic or aromatic and has both valencies linked to carbon atoms,
(3) units of formula I and formula III $$\{E'\text{—}O\text{—}E\text{—}O\}$$ (III)

wherein E is the residuum of a dihydric phenol and E' is the residuum of a benzenoid compound having an inert electron-withdrawing group of sigma* value above about +0.7 in at least one of the positions *ortho* or *para* to the valence bonds, or
(4) units of formula I and formula IV

said polymer having a reduced viscosity of 0.3 measured at 25° C. on a solution in dimethyl formamide containing 1 g. of polymer in 100 cm.³ and the units of formula II, III and IV being different from the units of formula I.

2. A polymer according to claim 1 consisting essentially of repeating units of formula I

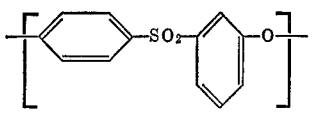

3. A polymer according to claim 1 which is a copolymer consisting essentially of units of formulae I and II:

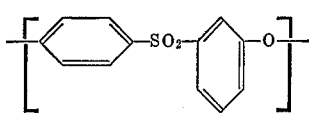

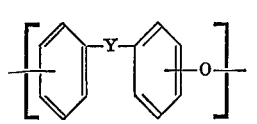

where Y is —SO₂—, —SO— or —CO— or a radical of the formula —Y'—A—Y''' in which Y' and Y'' are the same or different and each is —SO₂—, —SO— or —CO— and A is a bivalent organic radical which may be aliphatic or aromatic and has both valencies linked to carbon atoms, the units of formula II being different from the units of formula I.

4. A polymer according to claim 1 which is a copolymer consisting essentially of units of formulae I and III

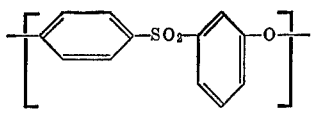

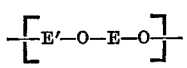

where E is the residuum of a dihydric phenol and E' is the residuum of a benzenoid compound having an inert electron-withdrawing group of sigma* value above about +0.7 in at least one of the positions *ortho* or *para* to the valence bonds.

5. A polymer according to claim 1 which is a copolymer consisting essentially of units of formulae I and IV

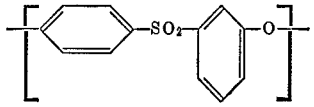

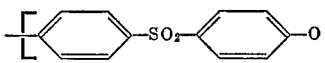

6. A method of making a polymer containing units of formula I:

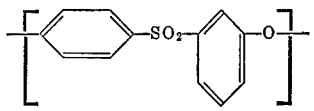

which comprises heating in the melt or in an inert polar organic liquid diluent an alkali metal salt of a halophenol of formula VI:

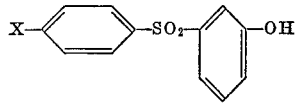

wherein X is halogen so that said salt is polymerised by the displacement of alkali metal halide, the heating being continued to form a polymer of formula I having a reduced viscosity of 0.3 measured at 25° C. on a solution in dimethyl formamide containing 1 g. of polymer in 100 cm.³.

7. A method according to claim 6 for making copolymers in which an alkali metal salt of a halo-phenol of formula VI:

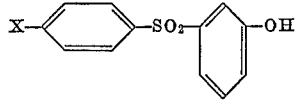

is included as an additional component in an anhydrous polymerisable reaction mixture containing a double alkali metal salt of a dihydrate phenol and a dihalo-benzenoid compound having an inert electron-withdrawing group of sigma* value above about +0.7 in at least one of the positions ortho or para to the halogen atoms in the liquid phase of an inert highly polar organic solvent and said mixture is heated to form said polymer.

8. A method according to claim 6 for making copolymers, in which an alkali metal salt of a halo-phenol of formula VI

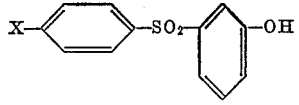

(where X is halogen) is copolymerised with an alkali metal salt of a 4-(4-halogenophenylsulphonyl)phenol.

References Cited
UNITED STATES PATENTS

| | | | |
|---|---|---|---|
| 3,264,536 | 8/1966 | Robinson et al. | 317—258 |
| 3,332,909 | 7/1967 | Farnham et al. | 260—47 |
| 3,367,974 | 2/1968 | Apel et al. | 260—607 |

LESTER L. LEE, Primary Examiner

U.S. Cl. X.R.

117—161 R; 260—30.4 R, 30.8 R, 30.8 DS, 32.4, 32.6 R, 33.2 R, 33.4 R, 607 A

PO-1050
(5/69)

UNITED STATES PATENT OFFICE
CERTIFICATE OF CORRECTION

Patent No. 3,832,331    Dated August 27, 1974

Inventor(s) Alan Branford Newton

It is certified that error appears in the above-identified patent and that said Letters Patent are hereby corrected as shown below:

In the heading of the patent, add:

--Foreign Application Priority Data

March 27, 1968   Great Britain... 14765/68--

Column 2, lines 20 to 30, should read:

--...., for example, ether oxygen  (—O—), carbonyl 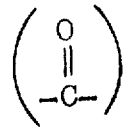, sulfide (—S—), sulfone 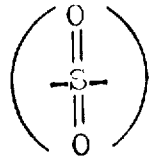,   --

Column 2, line 55,  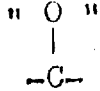 should be 

Column 3, line 45,  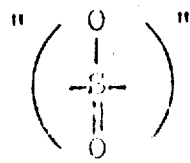 should be 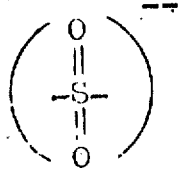

UNITED STATES PATENT OFFICE
CERTIFICATE OF CORRECTION

Patent No. 3,832,331      Dated August 27, 1974

Inventor(s) Alan Branford Newton

It is certified that error appears in the above-identified patent and that said Letters Patent are hereby corrected as shown below:

Column 6, line 7, "benbophenone" should be --benzophenone--

Column 6, line 37, "haldie" should be --halide--

Signed and sealed this 11th day of February 1975.

(SEAL)
Attest:

RUTH C. MASON
Attesting Officer

C. MARSHALL DANN
Commissioner of Patents
and Trademarks